United States Patent [19]

Yasuyuki et al.

[11] 4,420,239

[45] Dec. 13, 1983

[54] EXCHANGE MOUNT WITH DATA TRANSMITTING ELECTRICAL CONTACTS

[75] Inventors: Haneishi Yasuyuki; Shinsuke Komoto, both of Tokyo, Japan

[73] Assignee: Asahi Kogaku Kogyo Kabushiki Kaisha, Tokyo, Japan

[21] Appl. No.: 372,776

[22] Filed: Apr. 28, 1982

[30] Foreign Application Priority Data

May 1, 1981 [JP] Japan .......................... 56-63619[U]

[51] Int. Cl.³ .............................................. G03B 17/00
[52] U.S. Cl. .................................. 354/286; 354/455; 350/257
[58] Field of Search ................. 354/46, 286, 289, 271; 350/252, 257

[56] References Cited

U.S. PATENT DOCUMENTS

| | | | |
|---|---|---|---|
| 4,104,649 | 8/1978 | Tanaka et al. | 354/286 |
| 4,230,403 | 10/1980 | Hashimoto et al. | 354/286 |
| 4,357,089 | 11/1982 | Okura et al. | 354/286 |

*Primary Examiner*—A. A. Mathews
*Attorney, Agent, or Firm*—Sughrue, Mion, Zinn, Macpeak and Seas

[57] ABSTRACT

A lens exchange mount for a camera mount of a camera body has a contact pin supported in a lens mount to transmit lens data to a camera circuit during an automatic exposure camera operation. An "auto" and "manual" switching lever is connected to a fixing ring, and a switching contact is connected to the switching lever. When the switching lever is set to "auto", the switching contact electrically connects a first electrical contact, supported in the lens exchange mount, and the contact pin so that the latter is electrically connected to a camera circuit so that lens data are transmitted to the camera.

8 Claims, 8 Drawing Figures

EXCHANGE MOUNT WITH DATA TRANSMITTING ELECTRICAL CONTACTS

BACKGROUND OF THE INVENTION

1. Field of the Invention

The present invention relates to a lens exchange mount having electrical contacts for transmitting data.

2. Description of the Prior Art

Two automatic exposure control systems are available for automatic exposure control type cameras. The first automatic exposure control system is a shutter-priority system wherein an exposure time or a shutter speed is manually selected by the photographer with priority, and the size of the aperture opening is determined by the camera from the shutter speed thus selected so as to automatically provide suitable exposure. The second automatic exposure control system is an aperture-priority system wherein the aperture size is selected by the photographer, and the exposure time is automatically controlled by the camera so that, again, suitable exposure is provided using the exposure time thus selected.

For convenience in description, the first system will be referred to as "auto", and the second system will be referred to as "manual". The term "manual", as used herein, is broadly defined to also include the case where the photographer manually sets both the shutter speed and the aperture size without using the automatic exposure control of the camera.

In general, in carrying out an automatic exposure control and in displaying the shutter speed and the aperture size according to the automatic exposure, data from the lens, such as the maximum aperture size and the minimum aperture size of the lens, must be transmitted to the camera body when the exchangeable lens is coupled to the camera body. In order to satisfy this requirement, electrial contacts are provided on the confronting surfaces of the mounts of the camera body and of the photographing lens, respectively, so that data from the lens are transmitted, as electrical signals, directly to the camera body from the lens.

FIG. 1 shows a prior art device having electrical contacts for transmitting the "auto" and "manual" switching data. On the camera body, as shown in FIG. 1, an electrical contact 1 is so designed that it does not protrude from a mount surface while, on the photographing lens, an electrical contact 2 is urged to protrude from the mount surface. A switching plate 5 is rocked through a switching member 4 by the "auto" and "manual" switching operation of an aperture control ring 3 so as to cause the urged electrical contact 2 on the photographing lens to retract into and protrude out of the mount surface. Therefore, the electrical contact 2 is moved into and out of engagement with the electrical contact 1 on the camera body so that proper connection and disconnection of the necessary circuits are achieved.

FIG. 2 shows another device having electrical contacts for transmitting the inherent aperture size data of the lens to the camera. As shown in FIG. 2, a switching member 7, provided for fixing ring 6 on the lens, is externally operated to cause an electrical contact 8, integral with the switching member 7, to retract into and protrude out of the lens mount surface so that electrical contact 8 is moved into and out of engagement with an electrical contact 9 on the camera. Thus, proper connection and disconnection of the necessary circuits again are achieved.

However, since a transmitting means, such as the switching member, must be provided or each lens in the above-described prior art devices, the manufacturing cost of the lens barrel is increased. Furthermore, the provision of such a switching member in the lens barrel increases the weight of the lens barrel, and, since there often is little available excess space in the lens barrel, it is thus difficult to design the lens barrel and the lens so that the switching member can be incorporated.

SUMMARY OF THE INVENTION

Accordingly, an object of the present invention is to provide an exchange mount having an improved switching member and improved data transmitting electrical contact design. In the preferred embodiments, only a limited number of contact pins are required to be provided on a mount surface on the lens in correspondence to the data to be transmitted, such as the inherent aperture size data of the lens, thus resulting in a compact and simplified construction. In addition, in the device of the invention, no mechanism is required to make the contact pins retract into and protrude out of a lens.

DESCRIPTION OF THE PREFERRED EMBODIMENTS

Figure 1:
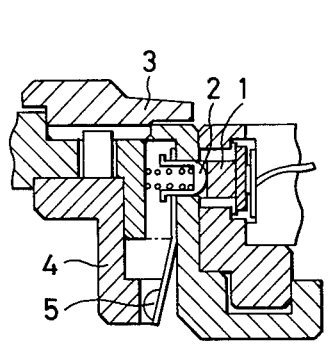
FIGS. 1 and 2 are sectional views showing the essential components of a conventional electrical connection mechanism.
Figure 2:
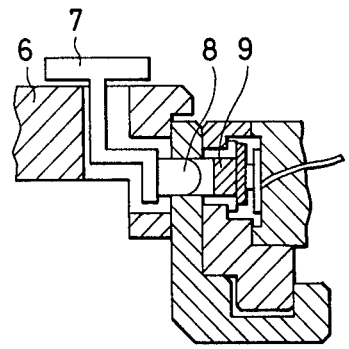
Figure 3:
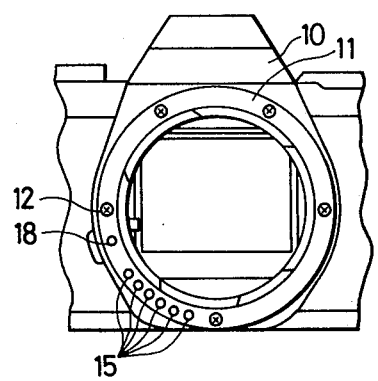
FIG. 3 is a front view of part of a camera body.

FIG. 3 is a front view of part of a camera body 10. An electrically conductive mount 11 is fixedly secured to the camera body 10 with screws 12. A branch line, which is connected to the mount 11, extends from an exposure control circuit (not shown) provided in the camera body 10.

Figure 4:
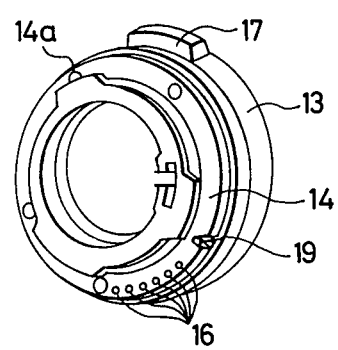
FIG. 4 is a perspective view of an exchange mount which is coupled to the camera body of FIG. 3.

FIG. 4 is a perspective view of an exchange mount 13 which is mounted on the mount 11 of the camera body 10. Similarly, as in the case of the camera body 10, an electrically conductive mount member 14 is secured to the exchange mount 13 with screws 14a. Electrical contacts 15 and 16 are provided on the mount 11 of the camera body and the mount member 14 of the exchange mount 13, respectively, so that the electrical contacts 15 and 16 are electrically connected together. These contacts transmit, to the camera body, the inherent aperture size data from the lens barrel which is connected to one end of the exchange mount 13, as well as other important data such as electrical data governed by electrical elements such as resistors.

An "auto" and "manual" switching lever 17, which can be operated externally, is provided on the outer wall of the exchange mount 13. When the lever 17 is set to "auto", data from the lens are transmitted to the camera body, as described below. In FIG. 4, the lever 17 is turned about the optical axis to achieve the switching operation; however, it may be so designed as to be operated perpendicularly to the optical axis, using a button to achieve the same switching operation.

As is apparent from FIGS. 3 and 4, the exchange mount 13 is coupled to the camera body 10 in a conventional manner through bayonet engagement means. That is, the exchange mount 13 is rotated relative to the camera body so that the exchange mount is coupled to the camera body. When this rotation comes to an end, a lock pin 18, which is urged to protrude from the mount 11 of the camera body, is engaged with a lock groove 19 formed in the mount member 14 of the exchange mount 13. When the exchange mount 13 is coupled and locked to the camera body 10, the electrical contacts 15 are electrically connected to the electrical contacts 16.

Figure 5:
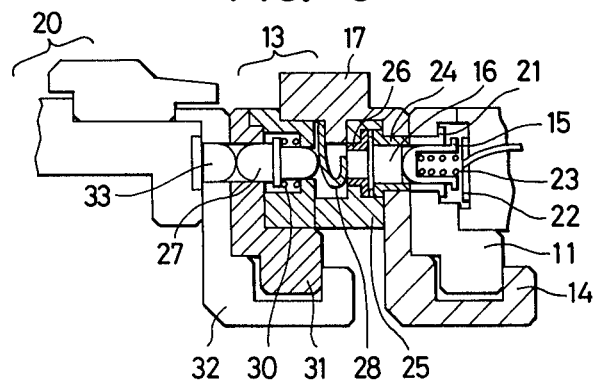
FIGS. 5 and 6 are sectional side views showing the essential components of a first embodiment of the present invention.

When a lens barrel 20 has been mounted on the exchange mount 13, and the switching lever 17 of the exchange mount 13 has been set to "auto" in the state where the exchange mount 13 has been coupled to the camera body 10, the electrical connections are as shown in FIG. 5. On the side of the camera body 10 (left side in FIG. 5), each electrical contact 15 is electrically insulated from the mount 11 of the camera and brought into contact with a substrate 22, which is connected to branch lines that extend from various circuits such as an exposure control circuit (not shown) in the camera. Furthermore, the electrical contact 15 is brought into contact with the respective electrical contact 16 on the mount member 14 on the exchange mount 13. The electrical contact 15 protrudes from the mount surface 11 due to the biasing force of a spring 23. The electrical contact 16 is electrically insulated from the mount member 14 and a fixing ring 25, which are made of electrically conductive material, by collars 24 and 26. There is a predetermined space between the rear end of the electrical contact 16 and a transmitting contact 27, which is provided in the mount member 14. The switching contact 28 of the switching lever 17 is arranged in the space between the rear end of the electrical contact 16 and the transmitting contact 27. FIG. 5 shows a state of the switching contact 28 when the switching lever 17 has been set to "auto".

The transmitting contact 27 is urged not to protrude from a front surface of a mount member 31 of the exchange mount 13 by a spring 30. The lens barrel 20 is connected to the mount member 31 by a mount 32. A contact pin 33 protrudes from the mount 32 of the lens barrel 20, and pushes the transmitting contact 27 towards the camera body 10 against the elastic force of a spring 30; therefore, one end of the transmitting contact 27 presses against the switching contact 28 of the switching lever 17. As a result, the switching contact 28 is brought into contact with the electrical contact 16. Therefore, the mount 11 of the camera body 10, the camera side mount member 14 of the exchange mount 13, the fixing ring 25, the transmitting contact 27, the switching contact 28, the electrical contact 16 of the exchange mount 13, and the electrical contact 15 on the camera are electrically connected. This results in the branch line of the control circuit, which is connected to the electrical contact 15 on the camera, being connected to the branch line of the same circuit connected to the camera mount 11 so that the desired data, such as the inherent aperture size data of the lens, is transmitted to the camera.

In the case where the camera side mount member 14 of the exchange mount 13 is made of electrically non-conductive (dielectric) material, connecting pins must be embedded in the camera side mount member 14 of the exchange mount 13 so that the camera mount 11 is electrically connected to the fixing ring 25 of the exchange mount 13. In this electrical connection design, the switching contact 28 of the switching lever 17 is brought into contact with the electrical contact 16 when the contact pin 33 of the lens barrel mount 32 is depressed as the lens barrel 20 is mounted on the camera side mount member 31. Thus, the branch line of the circuit connected to the electrical contact 15 is connected to the branch line connected to the camera mount 11.

Figure 6:
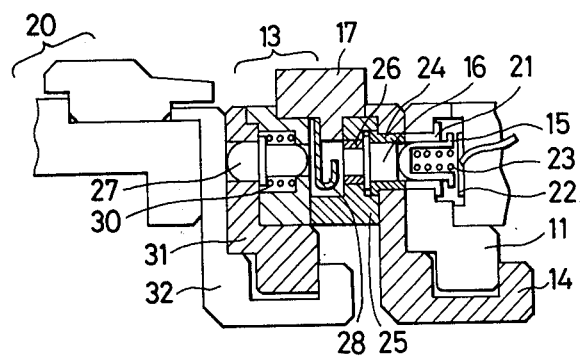

FIG. 6 shows a position of the lens barrel mount 32 where no contact pin 33 is provided. In FIG. 6, the switching lever 17 has been set to "auto", and, in this case, the transmitting contact 27 is pushed towards the lens barrel by the elastic force of the spring 30. Thus, the switching contact 28 of the switching lever 17 does not contact the electrical contact 16, and no current flows therethrough.

As is apparent from the above description, the inherent lens data, such as aperture size, are indicated by the number of contact pins 33 or the positions thereof, and the lens data are transmitted to the camera when the contact pins 33 depress the transmitting contacts 27. This effect can be obtained by merely embedding the contact pins 33 in the mount 32 of the lens barrel 20, in accordance with the inherent aperture size data of the lens barrel 20.

Figure 7:
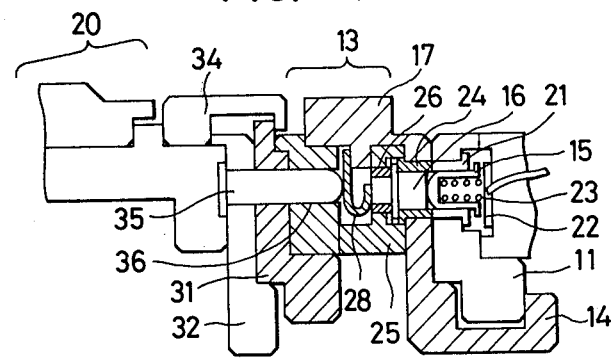
FIGS. 7 and 8 are sectional side views showing the essential components of a second embodiment of the present invention.
Figure 8:
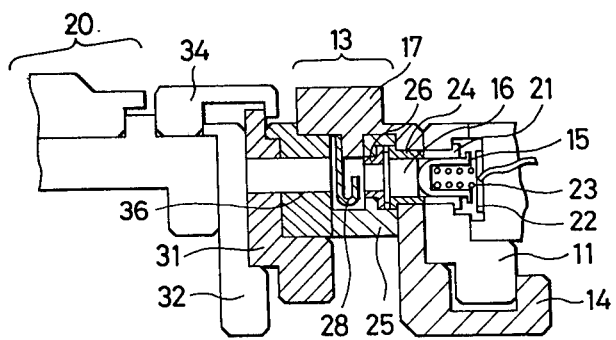

In FIGS. 7 and 8, after the lens barrel 20 is mounted on the exchange mount 13 by being moved in the direction of the optical axis, the lens barrel 20 is secured to the exchange mount 13 with a tightening ring 34, which is provided on the outer wall of the lens barrel 20. In these cases, unlike the above-described embodiment, it is unnecessary to turn the lens barrel 20 about the optical axis in order to mount the lens barrel 20 on the exchange mount 13. Therefore, long contact pins 35 may be provided in the lens barrel mount 32, and, in this case, throughholes 36 are formed in the exchange mount 32 for receiving the long contact pins 35. When the lens barrel 20 is mounted on the exchange mount 13, the long contact pins 35 are inserted into the throughholes 36. Therefore, when the lens barrel 20 is completely secured to the exchange mount 13, each long contact pin 35 presses the switching contact 28 so that the desired electrical connection is achieved, as shown in FIG. 7.

FIG. 8 shows a position of the lens mount 32 where no long contact pin 35 is provided. In this case, the switching contact 28 is not pressed and no current flows, as in the case of the above-described embodiment.

As is clear from the above description, when the exchange mount is constructed as described above, the contact pins for transmitting the lens data are provided only in the lens barrel mount. Therefore, it is unnecessary to provide a switching member and a mechanism for causing contact pins to retract into and protrude out of the lens; thus, the manufacturing cost and the weight of the lens barrel can be reduced. Furthermore, the exchange mount itself, being simple in construction, can be manufactured easily.

We claim:

1. An exchange mount for a camera mount of a camera body comprising:

a camera side mount member (14) capable of being mounted on said camera mount (11) of said camera body (10);

a fixing ring (25);

an "auto" and "manual" switching lever (17) connected to said fixing ring;

a lens mount member (31) and a lens mount (32) on which a lens barrel (20) is mounted;

a first electrical contact (16) located in said camera side mount member, said first electrical contact confronting and contacting a second electrical contact located in said camera mount when said camera side mount member is mounted on said camera mount, said second electrical contact being connected to a camera circuit;

contact pin means (33, 27, 35) located in said lens mount;

a switching contact (28) coupled to said switching lever, said switching contact electrically interconnecting said contact pin means and said first electrical contact when said switching lever is set to "auto" so that said contact pin means is electrically connected to said camera circuit.

2. The exchange mount claimed in claim 1 wherein said contact pin means comprises a long contact pin which extends through an elongated aperture (36) in said fixing ring, said lens mount member, and said lens mount.

3. The exchange mount claimed in claim 1 wherein said contact pin means comprises a short contact pin (33) which extends through an aperture in said lens mount, a transmitting contact pin (27), and means (30) for biasing said transmitting contact pin away from said first electrical contact, said short contact pin protruding from a front surface of said lens mount and contacting said transmitting contact pin, urging said transmitting contact pin towards said first electrical contact.

4. The exchange mount claimed in claim 1, 2 or 3 further comprising means (24, 26) for electrically insulating said first electrical contact from said camera mount side member and said fixing ring.

5. The exchange mount claimed in claim 4 wherein said fixing ring and said camera mount side member are made of electrically conducting materials.

6. The exchange mount claimed in claim 4 further comprising connecting pins embedded in said camera side mount member for electrically interconnecting said camera side mount member and said camera mount.

7. The exchange mount claimed in claim 1, 2 or 3 wherein said switching contact is displaced from said contact pin means and said first electrical contact when said switching lever is set to "manual" so that said contact pin means is not electrically connected to said camera circuit.

8. The exchange mount claimed in claim 1, 2 or 3 wherein plurality of contact pin means are located in said lens mount in accordance with desired data to be transmitted to said camera circuit.

* * * * *